Figure 1:
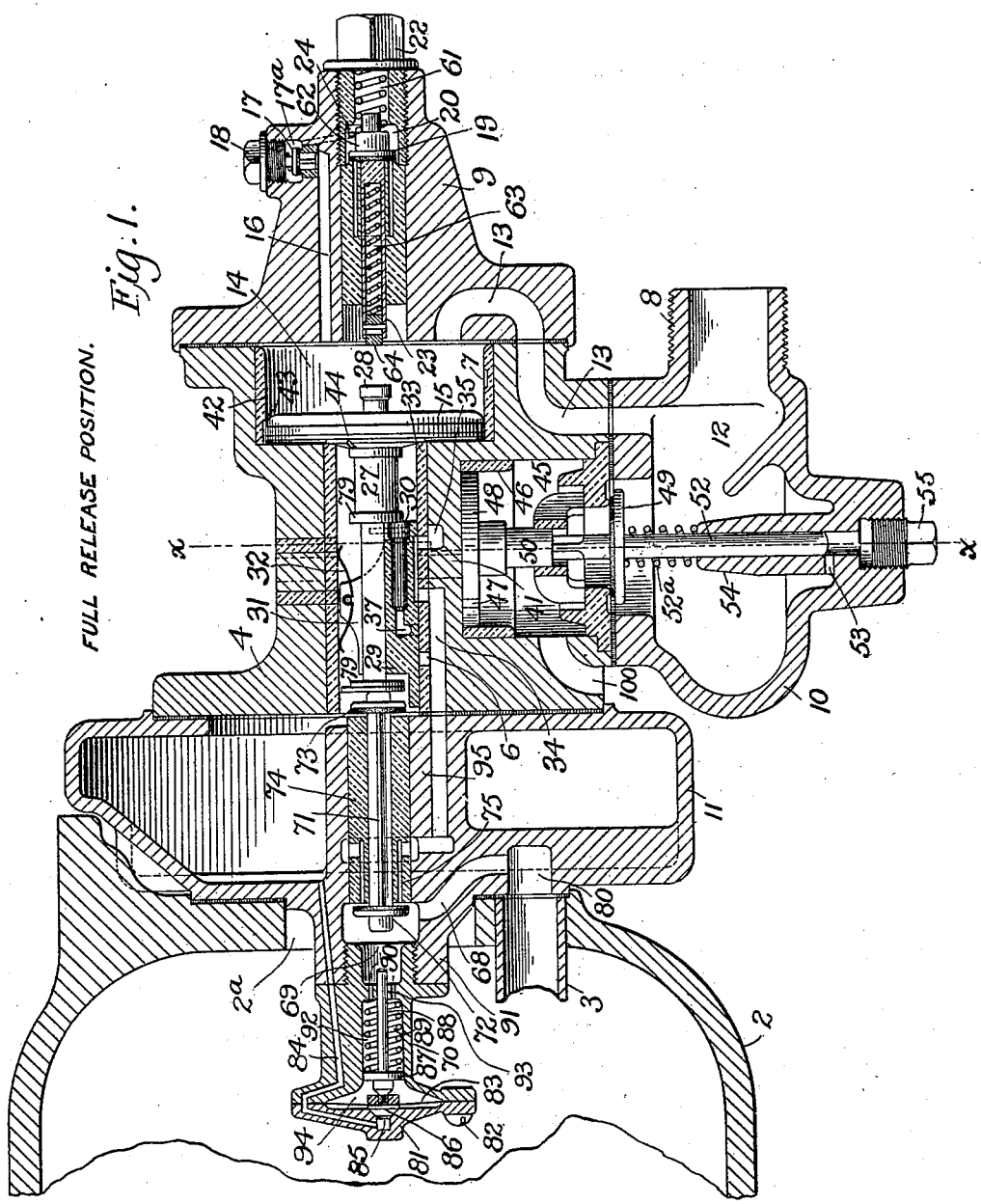

No. 690,468.  
Patented Jan. 7, 1902.

E. G. SHORTT.
AIR BRAKE VALVE MECHANISM.
(Application filed Mar. 11, 1901. Renewed Oct. 18, 1901.)

(No Model.)  
10 Sheets—Sheet 1.

WITNESSES:  
James P. Duhamel  
Charles H. Nason

INVENTOR  
Edward G. Shortt  
BY  
Fred E. Tacker  
ATTORNEY

No. 690,468. Patented Jan. 7, 1902.
E. G. SHORTT.
AIR BRAKE VALVE MECHANISM.
(Application filed Mar. 11, 1901. Renewed Oct. 18, 1901.)
(No Model.) 10 Sheets—Sheet 2.

WITNESSES:
James F. Duhamel
Charles H. Nason

INVENTOR
Edward G. Shortt
BY
Fred B. Tasker
ATTORNEY

No. 690,468. Patented Jan. 7, 1902.
E. G. SHORTT.
AIR BRAKE VALVE MECHANISM.
(Application filed Mar. 11, 1901. Renewed Oct. 18, 1901.)
(No Model.) 10 Sheets—Sheet 4.

on line x-x.

WITNESSES:
James F. Duhamel
Charles H. Nason

INVENTOR
Edward G. Shortt
BY
Fred E. Tasker
ATTORNEY

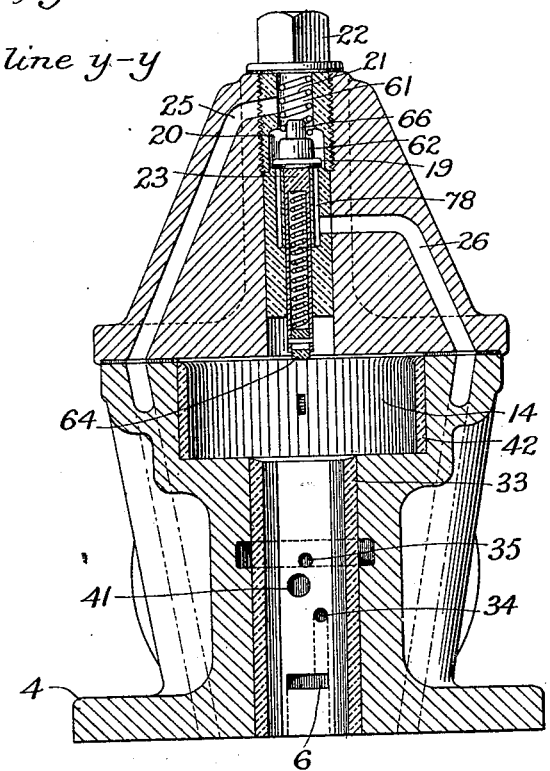

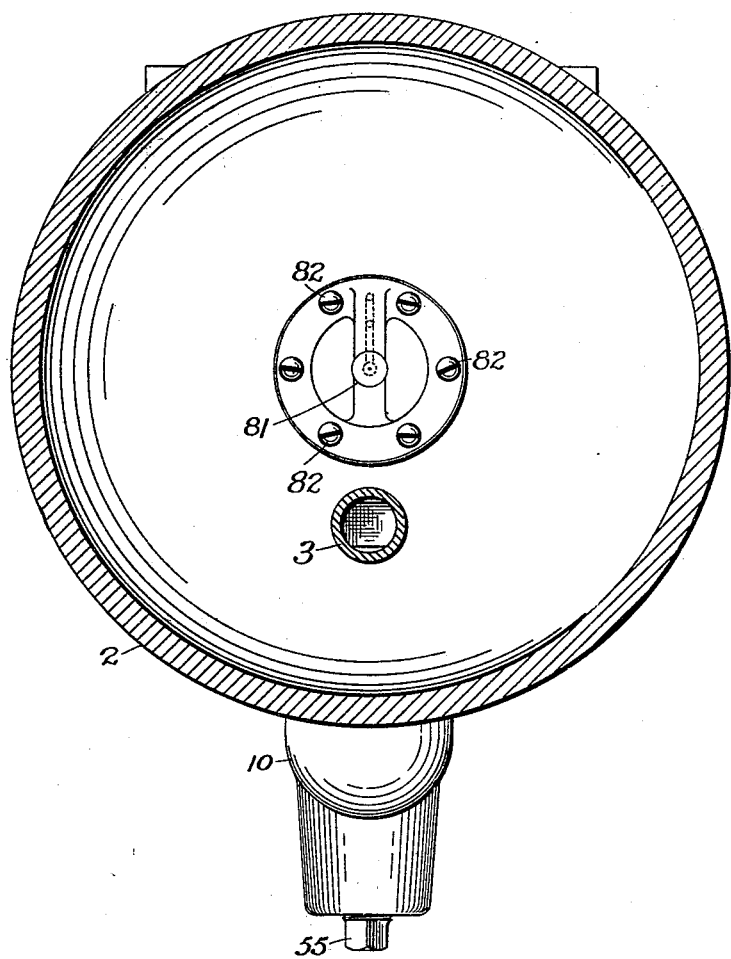

No. 690,468. Patented Jan. 7, 1902.
E. G. SHORTT.
AIR BRAKE VALVE MECHANISM.
(Application filed Mar. 11, 1901. Renewed Oct. 18, 1901.)
(No Model.) 10 Sheets—Sheet 7.
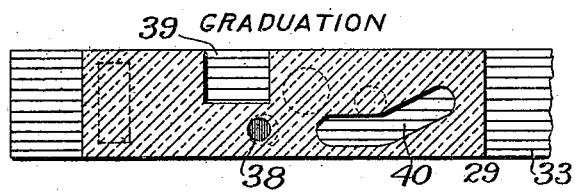
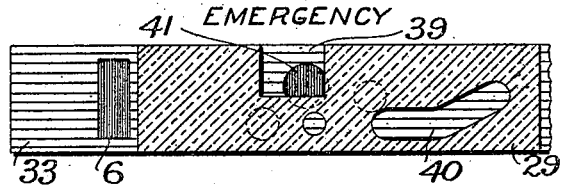
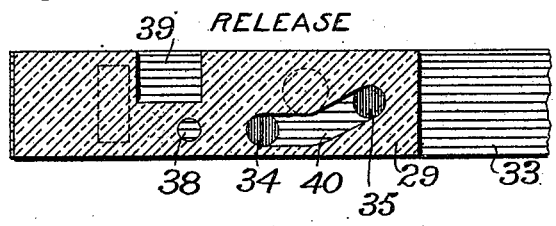
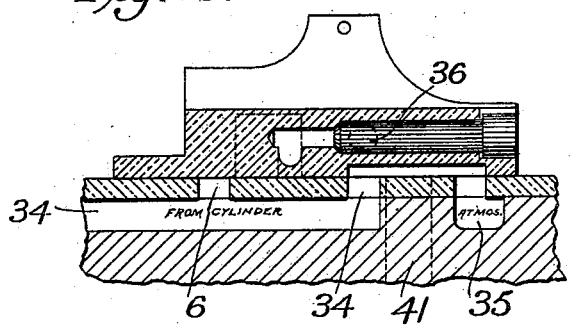
WITNESSES: INVENTOR
James F. Duhamel. Edward G. Shortt
Charles H. Nason BY Fred E. Tasker
ATTORNEY

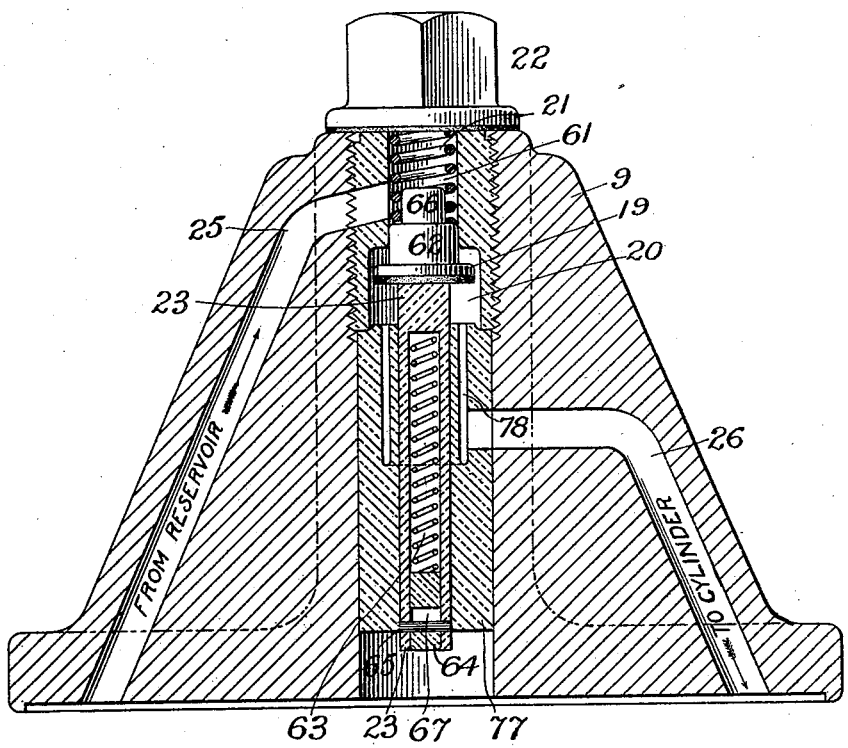

No. 690,468. Patented Jan. 7, 1902.
E. G. SHORTT.
AIR BRAKE VALVE MECHANISM.
(Application filed Mar. 11, 1901. Renewed Oct. 18, 1901.)
(No Model.) 10 Sheets—Sheet 9.

WITNESSES: James F. Duhamel, Charles H. Nason

INVENTOR Edward G. Shortt
BY Fred E. Tasker
ATTORNEY

No. 690,468. Patented Jan. 7, 1902.
E. G. SHORTT.
AIR BRAKE VALVE MECHANISM.
(Application filed Mar. 11, 1901. Renewed Oct. 18, 1901.)
(No Model.) 10 Sheets—Sheet 10.

UNITED STATES PATENT OFFICE.

EDWARD G. SHORTT, OF CARTHAGE, NEW YORK, ASSIGNOR TO INTERNATIONAL AIR BRAKE COMPANY, OF JERSEY CITY, NEW JERSEY, A CORPORATION OF NEW JERSEY.

AIR-BRAKE VALVE MECHANISM.

SPECIFICATION forming part of Letters Patent No. 690,468, dated January 7, 1902.

Application filed March 11, 1901. Renewed October 18, 1901. Serial No. 79,111. (No model.)

*To all whom it may concern:*

Be it known that I, EDWARD G. SHORTT, a citizen of the United States of America, and a resident of Carthage, county of Jefferson, and State of New York, have invented certain new and useful Improvements in Air-Brake Valve Mechanism, of which the following is a specification.

This invention relates to certain novel and valuable improvements in a valve mechanism for air-brakes.

I have numerous objects in view, the principal aim of the invention being to improve and perfect the triple valve in various respects, so that its operation may be more unfailing and its construction simpler and more economical.

In the use of this valve a great saving of air is effected over what is commonly the case in air-brake systems.

One important feature is the provision of a variable-sized or differential auxiliary reservoir the capacity of which varies and is the greatest when the pressure is high, being made so by the addition thereto of an extra chamber, called the "receiver," said receiver not being independent of and distinct from the auxiliary reservoir at all times, but only at those times when the pressure has fallen from the maximum down to a figure below which the pressure in the auxiliary reservoir can never drop except in case of emergency, said permanently-retained pressure in the reservoir being denominated the "reservoir constant," and it being understood that when the pressure does fall to the reservoir constant a subdividing device, consisting of some suitable valve means, will automatically come into action and cut off the receiver from the main chamber of the auxiliary reservoir, after which while the receiver is so cut off the latter functions as a depository to receive a large share of the exhaust-pressure from the brake-cylinder at the time of release after emergency action. The receiver is charged from the train-pipe, as is also the auxiliary reservoir, and in service applications pressure is delivered through the receiver from the reservoir to the brake-cylinder, while said receiver constitutes an extension of the reservoir and before the pressure has fallen to the reservoir constant, and in thus using air from the receiver and reservoir in service applications the supply in the receiver is being constantly replenished from the reservoir until whatever excess there may have been in the reservoir and receiver over and above the reservoir constant, which excess will ordinarily be ten pounds or so, has been consumed. It will thus be understood that a certain amount of pressure is reserved and retained in the auxiliary reservoir, amounting, perhaps, to sixty pounds or so, accordingly as experience may advise, which is never depleted, and is in readiness to be utilized in emergency applications only, while the contents of the receiver and the reservoir excess are utilized in graduation applications.

Another important feature is the conjoint utilization in emergency applications of the air within the receiver and the permanently-retained store of air in the auxiliary, the delivery of the receiver-pressure to the brake-cylinder taking place in advance of the delivery of the reservoir-pressure in order that by this process of initially transferring a comparatively light degree of pressure against the brake-piston and then superadding thereto the full power and strength of the air-volume in the auxiliary reservoir the most valuable and important results in the way of efficient braking by the employment of the highest attainable degree of braking power may be reached.

Another important feature which may be mentioned is the saving of a large amount of the braking fluid at the time of release after emergency application by returning the same to the receiver to be reused.

In the operation of the valve it must also be noted that at emergency simultaneously with the discharge of the receiver contents to the brake-cylinder there is a discharge of a portion of the same pressure which is within the slide-valve chamber to and against a piston that operates a valve, known as the "train-pipe emergency exhaust-valve," for permitting a venting of the train-pipe air to the atmosphere.

Numerous other important and distinguishing features will be patent from the ensuing description of the construction and operation of the mechanism, and it will be made apparent that from the improved construction marked and essential advantages are obtained, prominent among which is the ability of the apparatus to release without an excess of pressure and with a small train-pipe pressure. It may therefore be said that in addition to the various prominent points already mentioned the invention consists in numerous details and peculiarities of the construction, arrangement, and combination of the various parts, substantially as will be hereinafter described and claimed.

Figure 2:
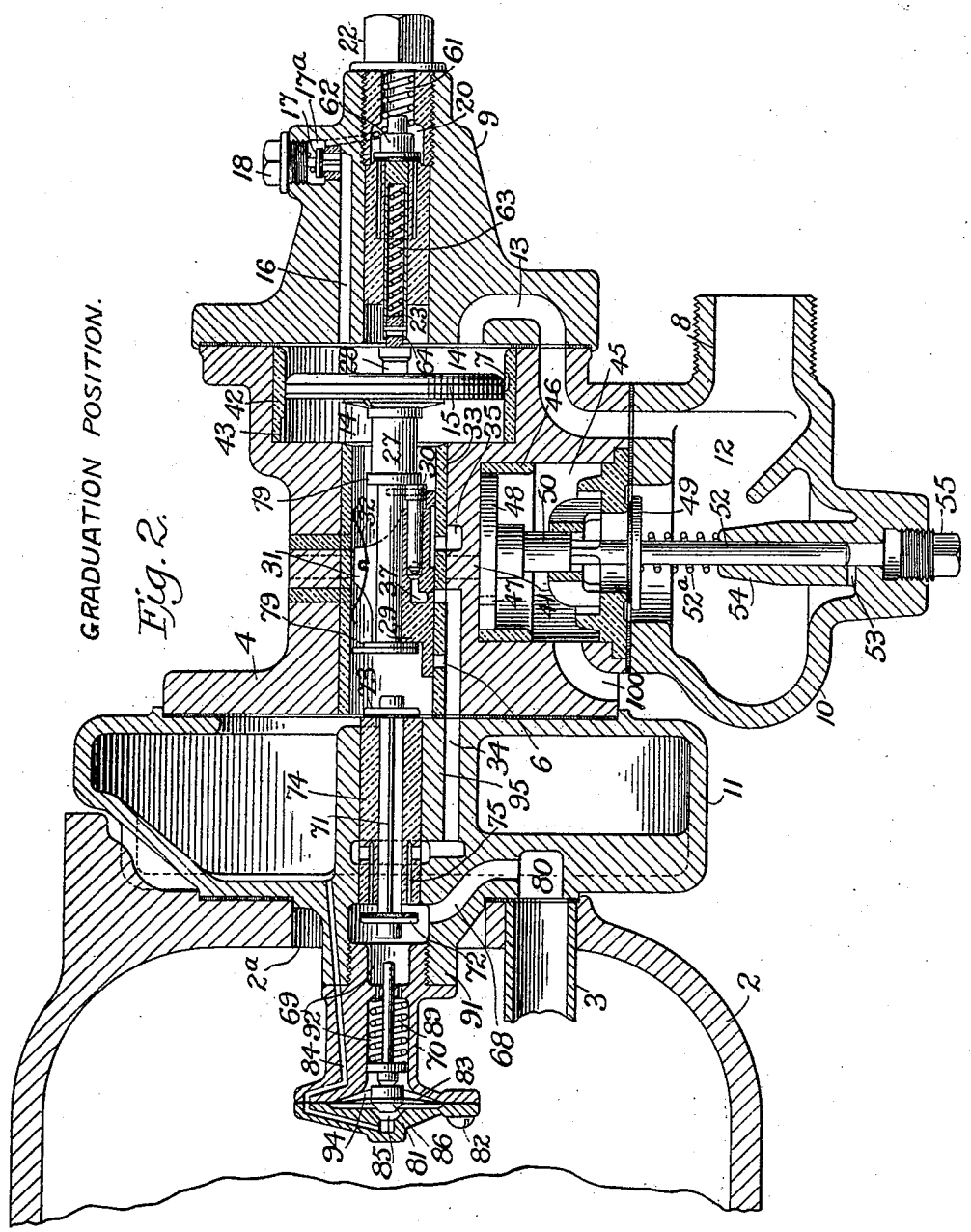
Figure 3:
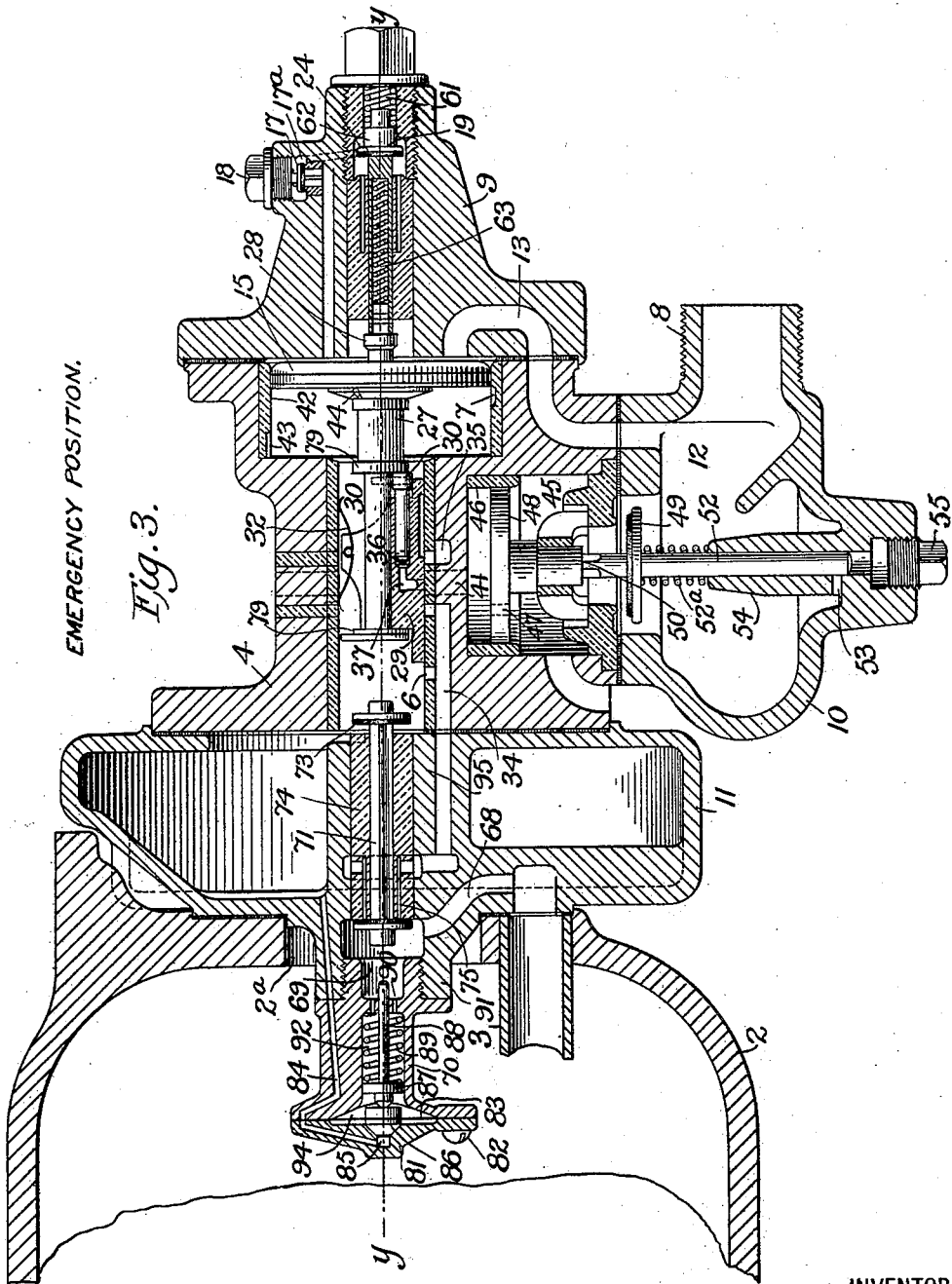
Figure 4:
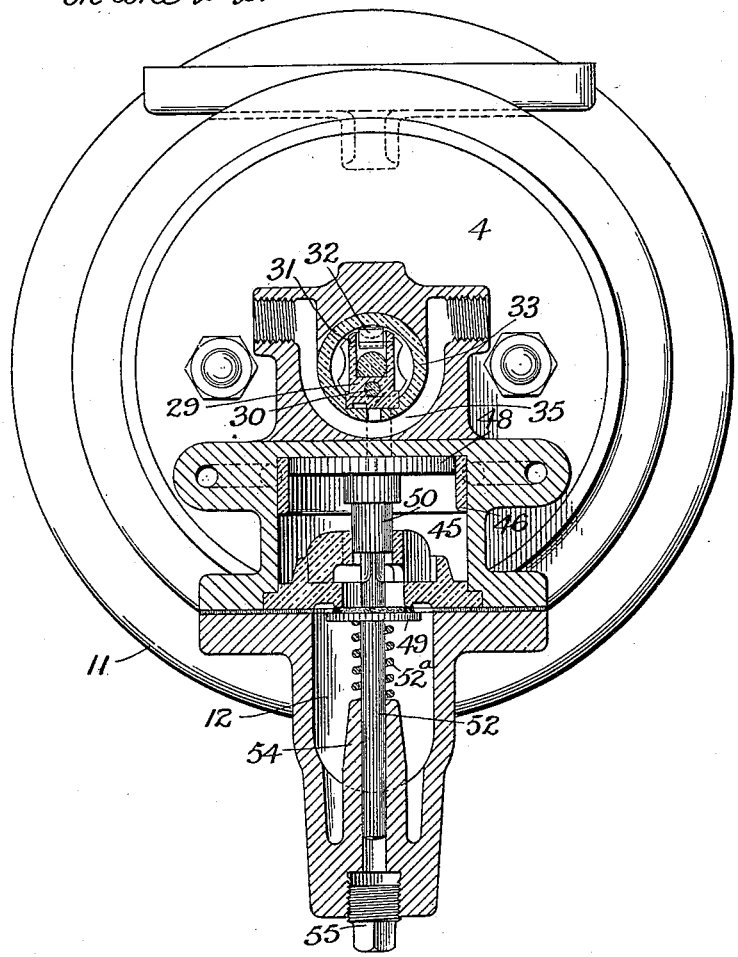
Figure 12:
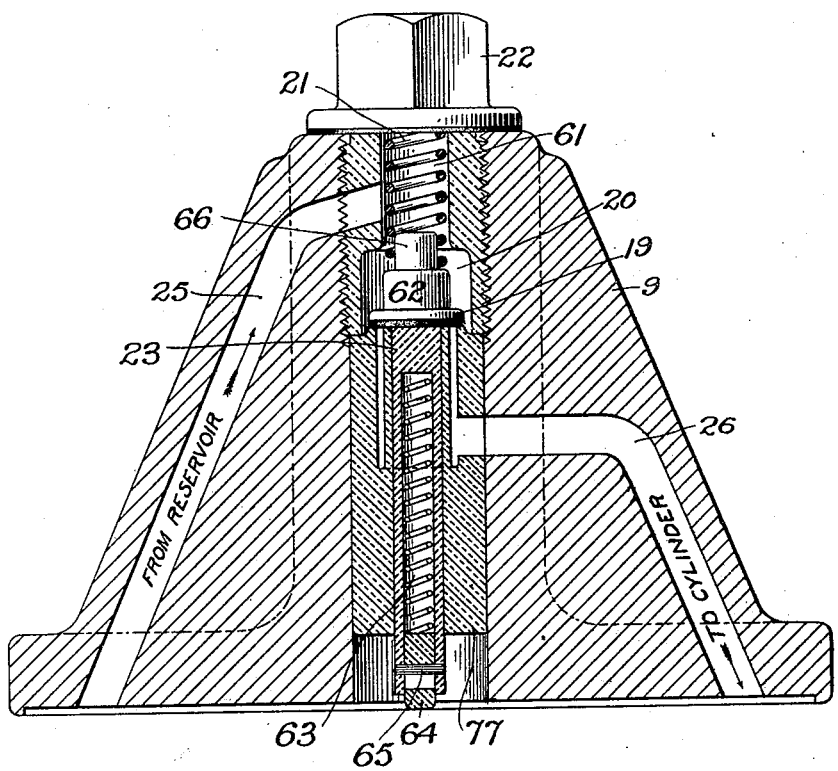
Figure 14:
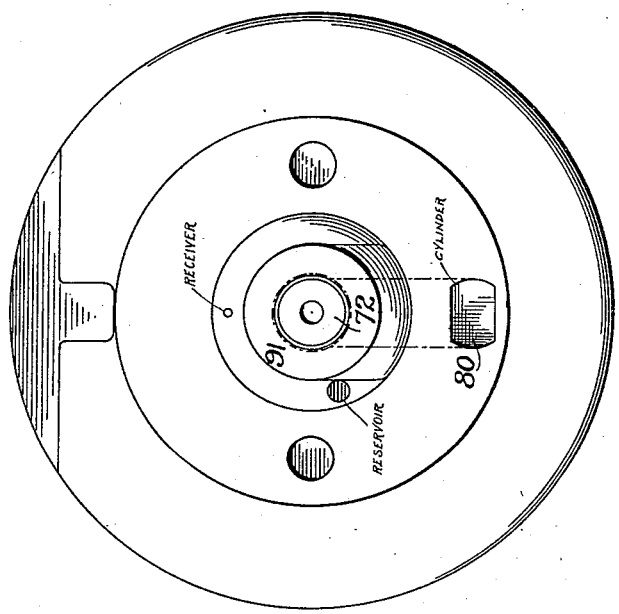
Figure 13:
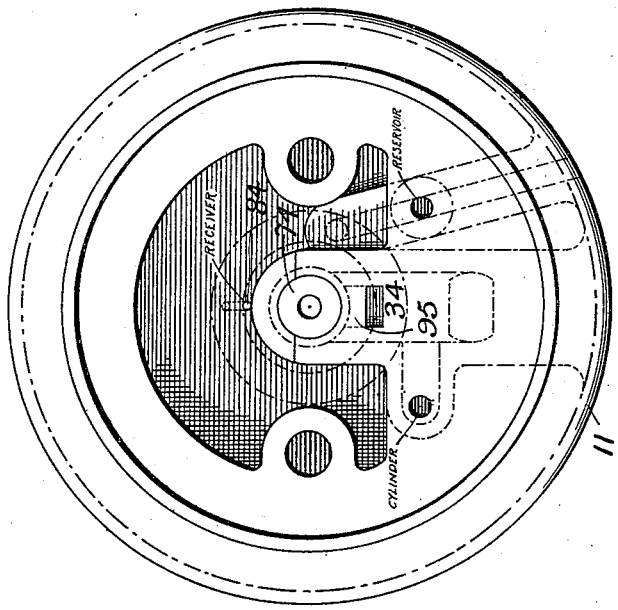

In the accompanying drawings, illustrating my invention, Figure 1 is a central vertical section of my present improved air-brake valve mechanism, the operative parts thereof being represented in the position of full release. Fig. 2 is a similar sectional view showing the parts in the position that may be termed the "graduation" position. Fig. 3 is a similar sectional view showing the coöperatively movable parts occupying the position that may be termed the "emergency" position. Fig. 4 is a transverse vertical section on the line $x\ x$ of Fig. 1. Fig. 5 is a transverse horizontal section on the line $y\ y$ of Fig. 3. Fig. 6 is a cross-sectional view of the auxiliary reservoir and shows the diaphragm-operated valve device in elevation centrally in said reservoir. Fig. 7 is a somewhat conventional delineation of the slide-valve and its seat for the purpose of presenting the proper relative arrangement and location of the ports of both parts at the time of graduation. Fig. 8 is a similar view showing the relative position of the ports at the time of emergency action. Fig. 9 is a similar view showing the relative position of these ports at the time of release. Fig. 10 is a longitudinal sectional view of the slide-valve and its seat, the graduation-valve being shown in side view. Fig. 11 is a central horizontal section of the conical cap that is attached to the right-hand end of the valve-body, together with the emergency-valve located in said cap, and represents said emergency-valve in the position off its seat, but with the projection thereon still cutting off communication between the reservoir and the cylinder. Fig. 12 is a similar central horizontal section of the conical cap and represents the emergency-valve therein occupying its normal position closed down upon its seat. Fig. 13 is an elevational view of the right-hand face of the receiver-chamber. Fig. 14 is an opposite face view of the same.

Similar characters of reference designate corresponding parts throughout all the different figures of the drawings.

I will now proceed to describe in detail my improved valve for air-brake mechanism and point out its various novel and valuable features.

It will be observed by looking at Figs. 1, 2, and 3 that the substantial and physical form of the valve comprises, essentially, the valve-body 4, a cap 9 on the right-hand side of said body 4, a drip-cup 10 on the bottom of the body, and a chambered casting constituting a receiver 11, located between the body 4 and the contiguous head of the auxiliary reservoir 2, the whole construction being supported by attachment to the auxiliary reservoir in any desired manner. In the particular form of reservoir and brake-cylinder depicted herein a pipe 3 runs from the cylinder through the auxiliary reservoir and connects with the triple valve, or rather with a side chamber in the receiver-casting, in a manner which I shall presently describe, so that said pipe 3 is to all intents and purposes, so far, at least, as function is concerned, a part of the brake-cylinder and is to be treated as such in the subsequent description herein.

The drip-cup 10 is merely a hollow casting situated below the body 4, and although primarily designed to catch any moisture that may fall from the working parts of the valve functions also to provide a train-pipe space 12, into which train-pipe air flows from a train-pipe branch which is coupled to the threaded projection 8 on cup 10, and, further, this drip-cup 10 furnishes a space wherein the train-pipe emergency exhaust-valve 49 operates, all as will be fully set forth. Within the cup 10, rising from the bottom thereof, is an integral hollow vertical guide 54, which receives the lower end of a rod 52, belonging to the train-pipe emergency exhaust-valve 49, a spring $52^a$ being tensioned between the top of guide 54 and the said valve 49, which spring serves to keep the valve 49 normally closed against its seat. The hollow guide 54 also serves to guide the rod 52 during the movements of the latter and of valve 49. The central passage of the guide 54 communicates with a recess on the bottom of cup 10, which recess is filled by a removable screw-plug 55, and an orifice 53 allows the drip within cup 10 to pass into the hollow stem 54 and above the plug 55. This plug 55 can be removed whenever desired for the purpose of getting rid of the waste accumulations in the drip-cup 10.

In a suitable chamber 14 of the valve-body 4 is a main piston, diaphragm, or abutment 15, having a rod 27. This piston 15 is adapted to slide within the bushing 42, fitted in the piston-chamber 14, there being a feed-port 43 at the left-hand edge of chamber 14, through which, when the periphery of piston 15 is directly opposite to it, so as to leave it open, as shown in Fig. 1, the air can flow from the right-hand side of piston 15 to the other side thereof and then through port 44, grooved in a part of the piston near its stem 27, into the interior of the slide-valve casing or seat 33, whence the pressure flows into the receiver 11, as I shall presently explain. At a certain point in the wall of the chamber 14—say about half-way of the width of bushing 42—another port 7 is cut in said bushing, and it has the function of an exhaust-port and serves to afford an exhaust-outlet to the train-pipe from the receiver 11 at such time in graduation action as the piston 15 has been placed directly opposite said port, so as to leave it open. Piston-chamber 14, or rather that part of the chamber on the right-hand side of the piston 15, constitutes a train-pipe space, and train-pipe air is delivered thereinto through the port 13 from the train-pipe space 12.

In the cap 9, which may be made of any convenient conical shape, is a horizontal reservoir-charging port 16, that communicates with and receives air from the piston-chamber 14. At the center of the cap 9 and near the apex of its conical form is an inner cavity 20, closed against the outer atmosphere by a removable screw-plug 22, a portion or the whole of said cavity 20, so far as it is serviceable, being furnished by a recess in the inner end of this plug 22, as is clearly shown in Figs. 11 and 12, and from the cavity or chamber 20 a cylindrical passage 61 leads through the shank of the plug 22 to a point opposite to the flanged portion thereof. On one side of the cap 9 is a check-valve-containing recess 17$^a$, in which is the check-valve 17, access to which may be had by removing the screw-plug 18. The above-mentioned port 16 runs straight from chamber 14 to the check-valve 17. A short port 24 leads from check-valve 17 to the inner cap-chamber 20. Thus it will be seen that a check-valve is interposed in the length of the reservoir-charging port, which effectually prevents any back flow of pressure from the reservoir during the operation of the valve mechanism. Within the chamber 20 is a valve 19, which may be correctly styled a "reservoir-delivery emergency-valve." This is closed, except at the time of emergency action, when it is desired to employ reservoir-pressure in braking, said valve 19 being commonly forced to its seat under the action of the auxiliary-reservoir pressure. By referring to Figs. 11 and 12 it will be seen that a port 25 runs from the chamber 20 through cap 9, the ultimate destination of said port being the auxiliary reservoir 2, and it will also be seen that a port 26 runs from the chamber 20 through the cap 9, its final direction being into the brake-cylinder. In Figs. 4, 5, 13, and 14 these two ports 25 and 26 appear and their courses are indicated, and it will be noticed that they lead along opposite sides of the valve-body 4, pass through the side walls of the receiver 11, and reach their final destinations, port 26 connecting with the brake-cylinder and port 25 with the auxiliary reservoir. Obviously a delivery of reservoir-air into port 26 from chamber 20 can only be had when the valve 19 is unseated.

77 designates the seat of valve 19. It is securely fastened in a central passage of the cap 9 and has itself a central passage containing the stem 23 of said valve 19, and also the seat-piece 77 has a short annular passage 78, that provides the channel of communication between chamber 20 and port 26 when valve 19 is open. (See Fig. 11.) The valve-stem 23 is hollow throughout a portion of its length and contains a spiral spring 63, tensioned against the inner end of the cavity in the stem and also against a movable axial block 64, situated at the extremity of the valve-stem and projecting for a short distance through and beyond the end of said stem, said axial block having therein a slot 67, through which passes a pin 65, which is fixed in the sides of the stem 23. The spiral spring 63 has the function of normally pushing the block 64 outwardly to a point where it projects beyond the end of stem 23 and where the pin 65 lies in one end of slot 67, the length of said slot determining the distance that the block 64 may protrude out of the stem 23. This axial block 64 serves when in its projected position as a graduation-stop to limit and determine the position of the piston in graduation action, and the spring 63 is of proper tension and strength to accommodate this function of the block. At certain times in the operation of the valve mechanism, when a graduation takes place after equalization is effected, the movement of the piston will be such as to thrust the block 64 inwardly until its outer edge comes flush with the tip end of the valve-stem 23, at which time the outer end of slot 67 will contact with the fixed pin 65, and thus the spring 63 will be temporarily compressed and will remain so until the piston again releases the axial block 64 and allows it to return to its normal position, as shown in Figs. 2 and 11. Furthermore, it is to be noted that the emergency-valve 19 is provided on the side opposite to the valve-stem 23 with a cylindrical projection 62 of proper diameter to enable it to fit loosely into the cylindrical bore of the passage 61, and integrally with the cylindrical projection 62 is a short stud 66 of considerably less size than projection 62, which stud 66 serves to receive the end of the spiral spring 21 and enables said spring to be tensioned at one end against the projection 62, while at the other end it bears against the opposite end of the passage 61. This spring 21 has the duty of normally holding the valve 19 upon its seat 77, and consequently over the passage 78, so as to close the latter. It will be observed that the reservoir-passage 25 does not enter the chamber 20 directly, but communicates with the passage 61, which, we have seen, is an extension of the chamber 20. Now when the emergency-valve 19 is unseated the first result of its movement away from its seat will be to cause the cylindrical projection 62 to enter and loosely close the end of the passage 61, a movement which cuts off the reservoir-port 25 from the chamber 20, and thereby makes it impossible for reservoir-pressure to be delivered to the brake-cylinder so long as the end of the passage 61 is shut. I have mentioned the fact that the projection 62 fits loosely into the end of the passage 61, and this is a matter which must not be overlooked, for such loose fit is necessary in order to allow the passage of a slight amount of air past the valve projection 62 at the time of emergency. Therefore although the primary purpose of unseating the emergency-valve 19 is to allow reservoir-pressure to be delivered to the brake-cylinder, yet the plan of operation of my present improvements is not to cause this delivery of reservoir-pressure to take place instantaneously upon the opening of the emergency-valve, but is to cause the reservoir-pressure to be held in check for a brief time in the manner that I have explained, the object of this being to allow receiver-pressure to be first transferred to the brake-cylinder, whereby a pressure comparatively light is utilized in advance of the employment of the stronger reservoir-pressure. From my subsequent description of the operation of certain of the parts, which I shall give in considerable amplitude of detail, it will be understood that immediately after the unseating of the emergency-valve 19 and the cutting off of the reservoir-port 25 from chamber 20 and during the time that this reservoir-port is so cut off the receiver-pressure will be diverted into the brake-cylinder, and as this latter pressure diminishes in strength the emergency-valve 19 will begin to move back toward its seat, and when this movement has progressed far enough to withdraw the cylindrical projection 62 from the passage 61 the full reservoir-pressure from the port 25 will work through the chamber 20, past the valve 19, and on through the port 26 into the brake-cylinder, there to be superadded to the previously-introduced receiver-pressure, to the end that the strongest possible braking power may be secured in emergency action. It may be remarked in passing that in emergency action the throw of the piston 15 to the right will cause its central knob 28 to strike forcibly against the projecting end of the axial block 64, depressing the same, and then against the end of the stem 23, thereby thrusting the latter forward and causing an opening of the valve 19 in the manner which I have previously outlined and which I shall more fully explain when I come to a description of the operation of the device, whereas in graduation action the knob 28 will halt as soon as it touches the axial block 64, although when a graduation action takes place after equalization has been effected the halting of the piston will not occur until after the depression of the axial block and the coming of the projection 28 to a stop against the end of the valve-stem 23.

The stem 27 of the main piston 15, the slide-valve 29, and the graduation-valve 30 are arranged within an elongated chamber in the valve-body 4, which chamber is inclosed by a horizontal bushing or sleeve 33, which is tubular, with the exception of the bottom thereof, wherein is a rectangular groove, (see Fig. 4,) which forms a seat and guide for the movement of this rectangular-shaped slide-valve 29. A portion of the stem of piston 15 between the shoulders or flanges 79 79 on said stem is semicircular in form and lies between two flanges or ears 31 31 on the slide-valve 29, the length of the latter being slightly less than the distance between these shoulders 79, thereby permitting a limited movement of the piston 15 without moving the slide-valve 29. The graduation-valve 30 is attached to and moves with the stem 27 of piston 15 and lies within a suitable recess in the slide-valve 29, opening and closing the ports 36 36 in said slide-valve, and thus controlling the admission of air from the interior of the slide-valve chamber into the interior port 37 of the slide-valve, which port 37 opens into the port 38, which is one of the ports on the bottom face of the slide-valve 29 and that one which functions principally as a graduation-port. A flat spring 32 engaging the side flanges 31 and bearing against the adjacent side of the slide-valve chamber causes said slide-valve to tightly hug its seat.

The ports on the slide-valve and the coöperating ones in its seat must now be briefly described, and in order to more intelligently present their relation at different times I have placed upon the drawings the conventional representations in Figs. 7, 8, and 9, in which the rectangular or grooved seat 33 is shown and therewith a thin section of the slide-valve 29, the said section being so cut that the slide-valve ports may appear as they actually do upon the bottom or sliding face of the valve. On the bottom of the slide-valve there are three ports—the graduation-port 38, already mentioned, a lateral emergency-port 39, which is simply a rectangular or other shaped notch in one edge of the valve 29 in constant and open communication with the interior of the slide-valve chamber and designed during emergency action to allow a portion of the pressure in said chamber to pass out of it and into and through an emergency-port 41 for the purpose of operating the piston 48, as will be hereinafter more fully explained, and the elongated, bent, and shallow port 40, serving principally as a release-port and designed to connect the ports 34 and 35, leading, respectively, from the brake-cylinder and to the atmosphere. In the seat 33 are four ports, three of them being among those we have just mentioned—namely, port 35, leading to the atmosphere, (see Fig. 4;) port 34, leading to the brake-cylinder, (see Figs. 1, 2, and 3;) port 41, leading to the emergency-piston 48, and port 6, communicating with the brake-cylinder port 34 and having the function of a discharge-port for the contents of the receiving-chamber 11 at the time of emergency, said port 6 being located so as to be uncovered by the slide-valve 29 when the latter makes its maximum throw toward the right, as it does in emergency action, as shown in Figs. 3 and 8.

The receiver 11 is a receptacle of greater or less size for containing a quantity of air supplied thereto from the train-pipe during the charging up of the apparatus in a manner to be presently set forth at greater length, said receiver being also designed to receive a large quantity of air from the brake-cylinder at the time of release. This "receiver," as I prefer to term it, is located conveniently between the triple valve and the auxiliary reservoir, and consists simply of a hollow casting properly shaped and formed to enable it to provide a chamber of the requisite size, as also ports, passages, and recesses to permit the flow of air in the manner to be set forth. The interior of receiver 11 communicates freely, openly, and constantly with the interior of the slide-valve chamber. A very significant and preëminent characteristic of this receiver is that at certain times it is in communication with and substantially forms a part of the auxiliary reservoir; but there is a valve means between the auxiliary reservoir and the receiver, so that the latter is divided off from the reservoir when the pressure in the reservoir falls to a certain predetermined figure, so that a reserved store of air in the auxiliary reservoir is kept intact for use at times of emergency and is never depleted by being drawn upon in service action.

Referring to Figs. 1, 2, and 3, it will be observed that the left-hand side of the receiver frame or casting 11 is shaped with a protuberance 91, that provides therein a chamber 69, serving as an operating-chamber for one valve of a double valve to be presently described, and this protuberance 91 projects into and a shoulder thereon fits neatly into an opening $2^a$ in the end of the auxiliary reservoir 2. Into the open face of this protuberance 91 screws or otherwise connects a valve-chamber casting 70. It has a horizontal cylindrical passage 92 therein, in which reciprocates a disk 87, having a stem 88, which plays through and is guided by a partition 93 between the passage or cavity 92 and the aforesaid valve-chamber 69, there being perforations 90—two or more or a series of them—around the stem 88 to permit a passage of air from the chamber 69 to the cavity 92. Around the disk stem or rod 88, within the cavity 92, is a spiral spring 89, which is tensioned between the disk 87 and the opposite end of cavity 92 and which has the function of forcing the disk 87 normally toward the left-hand end of cavity 92. The said cavity 92 widens at its left-hand end into a shallow recess 94, having a circumference much larger than the cylindrical cavity 92, and it is covered and closed by a flexible metallic diaphragm 83, secured in place by means of screws or other securing devices 82, of which there may be a plurality, arranged in a circle and indicated in Fig. 6. At the left of the diaphragm 83 is a vertical rib 81, secured at its top and bottom ends to the casting 70 at the edge of the diaphragm 83, said rib 81 being adapted and arranged to arch over the diaphragm 83 centrally and vertically, so that the diaphragm may be so situated with relation to the rib 81 as to be capable of a movement toward and away from it under any agency that may press thereon from the right or from the left. Thus it will be seen that although on the right-hand side of the diaphragm 83 there is a closed chamber 94, yet the other side or left-hand side of said diaphragm is exposed to the pressure within the auxiliary reservoir. At the center of the diaphragm 83 is carried a conical valve 86, the conical portion thereof being on the left-hand side of the diaphragm, while on the right-hand side is another portion engaged by the screw-threaded end of a pin which is fixed to or made integral with the reciprocatory spring-actuated disk 87. The conical valve 86 controls the mouth 85 of a port 84, which leads from the center of the rib 81 upwardly through said rib and then by proper courses through the casting 70 and the protuberance 91 until it reaches and communicates with the receiver 11. When the valve 86 uncovers the mouth 85, the receiver 11 is placed in communication with the auxiliary reservoir 2. When the valve 86 covers mouth 85, the communication between the reservoir and receiver is instantly cut off, and it will be noted that the spring 89 by exerting its resilient power against the disk 87 will close the valve 86 unless there is a pressure on the reservoir side of the diaphragm 83 sufficient to overcome the power of the spring. In practice the receiver and the reservoir will be in communication when the pressure in the two is at a certain figure or in excess of that, which pressure must at all times be retained in the reservoir, so that even though air is drawn from the receiver in service applications until the reservoir-pressure drops to the reservoir constant the supply in the receiver will be replenished from the reservoir until the pressure in both falls to the predetermined figure mentioned, which of course may be such figure as practice demonstrates to be desirable—as, for instance, sixty pounds or any other suitable amount. It will be found essential, therefore, to set the spring 89 so that it will have a retaining power of sixty pounds, and therefore whenever the pressure in the auxiliary reservoir falls to sixty pounds the valve 86 will instantly close, and when the pressure in the auxiliary reservoir is in excess of sixty pounds the valve will be open and there will be connection between the reservoir and the receiver, or, in other words, whenever the pressure in the receiver and the reservoir is above the amount which experience has demonstrated should be retained in the reservoir for use in emergency and never drawn upon in service the receiver will be to all intents and purposes a part of or an extension of the reservoir, and it does not become transformed into an independent receiver in the form of a chamber separate and distinct from the auxiliary reservoir until all the excess in the reservoir over and above said fixed amount has been withdrawn therefrom.

At the center of the receiver 11 its casting or frame is so shaped as to provide a supporting part 95, in which is a seat-piece 74. The left-hand end of this seat-piece has an annular port 75 extending from the graduation-port 34 (which we have already seen runs from the slide-valve seat 33) to the chamber 69. In rectilinear alinement with the slide-valve and the main piston-stem is a valve device which I term a "secondary graduation and release valve," for it controls the flow of air from the slide-valve to the brake-cylinder in graduation action, as well as the return flow at the time of release and after emergency, a large portion of which return flow is conducted by means of this valve device into the receiver, and thereby saved and a great economy in the use of the air insured. Said valve device consists of two valves 72 and 73, carried on the opposite ends of a triangularly-shaped stem 71, which lies within a tubular central passage of the seat-piece 74, and this seat is supported, as I have suggested, in the part 95, so that it may be between the slide-valve chamber and the chamber 69, which latter chamber is, in fact, a casing for the valve 72. The valve 72 is designed to close or open the port 75. The valve 73, belonging to the valve device I am now describing, is situated at the left-hand end of the slide-valve chamber. When the valve 72 is closed, the valve 73 will be unseated, as is the case in emergency action, and when valve 73 is closed valve 72 will be unseated, as is the case in graduation action, or both valves may be slightly open at the same time, as is the case after emergency when the parts occupy the full release position delineated in Fig. 1, the reason and cause for which open condition of both valves will be set forth at greater length when I come to speak of the operation of the mechanism in detail.

In the left-hand side of the receiver-frame 11, adjacent to the brake-cylinder pipe 3, is a chamber 80, already alluded to as being a chamber that is entered by the port 26, through which air is conducted from the auxiliary reservoir to the brake-cylinder. A port 68 extends from chamber 69 to the chamber 80. Thus it will be seen that the valve 72 connects the graduation-port 34 and the brake-cylinder port 68 at the time of graduation, while at the time of release after emergency there is not only this same connection, although the size of the opening between the valve and its seat is smaller, but since both valves 72 and 73 are now unseated, as exhibited in Fig. 1, release-pressure will pass through the passage containing the triangular valve-stem 71 and be transferred from the brake-cylinder to the receiver.

48 designates the emergency-piston. It is provided with a rod 50, which carries the train-pipe emergency exhaust-valve 49, that opens at the time of emergency for the purpose of allowing the train-pipe air to pass through the piston-chamber 45 and out to the atmosphere by way of the exhaust-outlet 100. The piston 48 works within the chamber 45, in the upper part of which is a bushing 46, that lines that portion of chamber 45 through which the piston 48 plays. Vertically through the piston 48 passes a port 47, through which during the piston's descent the impelling air that depresses it at emergency may escape after the piston has been driven down to its lowest limit.

I will now describe how my improved air-brake valve mechanism is charged and how it operates in fulfilling its various functions in service and emergency applications of the brakes, as well as at the time of release.

Suppose now that the apparatus is empty and an initial charging of the same with air is to be effected. Air from the main reservoir on the engine being discharged into the train-pipe by the engineer's brake-valve enters the triple valve through the nozzle 8 and passes thence into the train-pipe space 12 and through port 13 to the piston-chamber 14, compelling the piston 15 to occupy the position shown in Fig. 1, which is the position it takes when the brakes are fully released, in which position the feed-port 43 is uncovered, so that air is permitted to pass by the piston, thence through the port 44 to the chamber occupied by the slide-valve, from which it flows freely into the receiver 11, charging the latter to the same pressure as that in the train-pipe. At the same time train-pipe pressure will flow through the reservoir-charging port 16, past the check-valve 17, into chamber 17ª, and thence through port 24, chamber 20, and port 25 into the auxiliary reservoir 2. When the pressure within the auxiliary reservoir rises above the valve-closing power of the spring 89—that is to say, above sixty pounds or any other predetermined pressure—the valve 86 will open and communication will be established through port 84 between auxiliary reservoir 2 and the receiver 11. Port 84 will now have the function for the time being of a reservoir-charging port. The process of charging may now be continued until the train-pipe, the auxiliary reservoir, the receiver, and the various interior spaces of the triple valve, as specified, will be filled with air at the train-pipe pressure of seventy pounds or such other figure as may be determined upon, and it will be noted that so long as the air-pressure is above what is to be constantly retained in the auxiliary reservoir said reservoir and the receiver will be in open communication with each other and will constitute in reality a single chamber, the subdivision between the two not taking place until the degree of pressure drops to the figure that causes the subdividing-valve to close. At the time of which we are now speaking the valve 73 will be closed upon its seat, as it is shown in Fig. 2, and not open, as indicated in Fig. 1, because the pressure within the slide-valve chamber will be against it, keeping it seated, while of course at this same time the valve 72 will be off its seat, although its open condition will not in the preliminary charging of the system be of any consequence, whereas at release, of course, it provides an outlet for the exhaust. The train-pipe emergency exhaust-valve 49 is now closed, so that train-pipe air cannot have exit to the atmosphere through the escape-outlet 100. The brake-cylinder emergency-valve 19 for transferring auxiliary air to the brake-cylinder is likewise closed. The position of the slide-valve 29 relatively to its seat 33 is as shown in Fig. 9, where it will be perceived that the release-port 40 connects the graduation-port 34 and the exhaust 35, and the position of the graduation-valve 30 is such that the lateral ports 36 36 are closed and no air can pass from the slide-valve chamber into the interior of the slide-valve. Of course the receiver emergency-port 6 is closed, the emergency-port 39 is closed, and the graduation-port 38 is also at this time idle.

I will now explain what occurs in going from the release or running position delineated in Fig. 1 to the graduation position, where the arrangement of the parts is as represented in Fig. 2, and in so doing it will be necessary to specify in detail the manner of making a service application of the brakes. The engineer's valve will be manipulated in the proper way to make the desired reduction in the train-pipe. As there will likewise be a simultaneous reduction of pressure in the ports and spaces directly in communication with the train-pipe, a reduction of pressure will take place in the piston-chamber 14 on the right-hand side of the piston 15, and accordingly the air-pressure on the opposite side of said piston will have an opportunity to expand against the piston, and such expansion will urge the piston toward the right until its central knob or the projection 28 contacts with the axial block 64, which projects beyond the end of the valve-stem 23, which block serves now as a graduation-stop, functioning to accurately define the position of the main piston 15 upon the occasion of graduation action. (See Fig. 2.) The movement of the piston 15 carries with it the slide-valve 29 and the graduation-valve 30. The graduation-valve being loosely connected, by means of a pin or otherwise, to the rod 27 starts to move before the slide-valve, since the latter does not begin to slide until caught against the terminal shoulder 79, and this preliminary impulse of the graduation-valve is sufficient to uncover the lateral ports 36 36 in the slide-valve and allow the pressure within the slide-valve chamber and also in the receiver and reservoir to enter into the interior space 37 of the slide-valve and to pass thence into the graduation-port 38. Moreover, this movement of the slide-valve 29 has disconnected the release-port 40 from the seat graduation-port 34 and has brought the slide-valve graduation-port 38 into coincidence with the seat graduation-port 34. (See Fig. 7, in which the relative position of the ports in the seat and in the slide-valve at the time of graduation is shown.) Hence air will flow through the graduation and slide valves from the auxiliary reservoir and receiver into the port 34, then through the valve 72, the brake-cylinder port 68, the brake-cylinder space 80, and on through the pipe 3 into the brake-cylinder. It will be clearly understood that in passing from running position to graduation position air will be used in the brake-cylinder that is taken from the receiver and the reservoir. So long as the available working pressure in the auxiliary reservoir is above that predetermined amount which is kept constant in the reservoir at all times the receiver is simply a part of the auxiliary reservoir and does not become an independent and separate chamber until the separating-valve operates to cut it off. Although in graduation action the air is drawn directly out of the receiver-chamber 11, yet during the time the receiver-chamber is a part of the auxiliary reservoir and in communication therewith any depletion of the air in receiver 11 will be immediately replenished from the reservoir, so that if the original charging of reservoir and receiver amounted to seventy pounds and the predetermined amount to be retained in the auxiliary reservoir at all times was sixty pounds the withdrawal of pressure from the receiver could go on until the pressure in the chambers had been reduced to the predetermined figure. It will therefore be understood that so long as the receiver is open to the reservoir graduation may take place; but when receiver is cut off from the reservoir graduation will no longer be possible, and while the receiver is so cut off its principal function is that of a receiver to save air from the brake-cylinder at release after emergency, although during emergency action the contents of the receiver are carried into the cylinder. It will be noted that during the time of graduation the pressure will fall faster in the receiver than in the reservoir, because the port 84 is small and allows the air to feed with comparative slowness from the reservoir to the receiver—that is, the port 84 is much smaller than port 37. I wish also to lay stress upon the fact that the reservoir contains a certain quantity of air which is kept intact at all times and entirely untouched for any other purpose than for use at the time of emergency. Of course it must not escape mention that such air as may have been transferred to the brake-cylinder during the applications of the brakes and which remains therein and does not flow out to the atmosphere at release will exert a back pressure, through the port 68, chamber 69, orifices 90, and cavity 92, against the piston 87 and diaphragm 83 to assist the tension of the spring 89 in keeping the diaphragm-valve closed. After there have been several successive graduations and the initial pressure in the system has been drawn down below the point where the diaphragm-operated valve closes, and the amount of pressure in the brake-cylinder through successive increments of increase has risen to a considerable degree, a point will finally be reached where equalization will take place, after which to graduate further would ordinarily result in a going to "emergency." In order to avoid this undesirable result, it is necessary to furnish a way for the escape of the excess of pressure that will be on the left-hand side of the piston. This way is provided through the port 7 in the side of the chamber 14. When a graduation application of this kind is made, the result of the contact of the central projection 28 with the axial block 64 will be to compress the latter, so that the central projection will strike against the end of the valve-stem 23; but it will not move said stem and dislodge the valve 19 from its seat, because the compression of the block 64 will have permitted to the piston 15 a movement enough farther than it would make in ordinary graduation to bring the periphery of piston 15 directly opposite to the port 7, thereby opening the port, and thus permitting the excess of pressure on the left-hand side of piston 15 to escape into the train-pipe and exhaust or blow off through the engineer's valve.

Having thus spoken of the method of primarily charging up the system with air and also of the operation of the triple-valve mechanism in the service applications of the brakes, I will now describe in detail what takes place in making an emergency reduction. When a case arises demanding instant remedy, a large and quick reduction of pressure will be caused to take place in the train-pipe by a suitable manipulation of the engineer's valve, and the consequences thereof to the piston 15 will be that it will not stop when its central knob touches the protruding axial block 64, as it does in ordinary graduation; neither will it stop when it has compressed said block and touched the end of the stem of the emergency-valve, as it does in the graduation that may be attempted after equalization; but the impact of the central projection 28 of piston 15 against the emergency-valve 23 will be so hurried and violent as to quickly thrust the same forward, and thereby dislodge the emergency-valve 19 from its seat and cause the brake-cylinder port 26 to become connected, through the annular port 78, with the inner chamber 20; but, as has heretofore been intimated, the removal of valve 19 from its seat does not instantaneously establish connection between the reservoir-port 25 and the chamber 20, because the cylindrical projection 62, carried by the valve 19, enters the end of the chamber 61 and virtually closes it, (except the loose fit alluded to,) thereby preventing, while the projection 62 is in this position, the reservoir-port 25 from delivering reservoir-pressure into chamber 20, and simultaneously with the collision of the piston or abutment and the emergency-valve stem, or perhaps slightly before the unseating of said valve, although the difference in time is inappreciable, the piston or abutment by its reciprocation and consequent movement of the slide-valve 29 brings the ports of said slide-valve into that relation to the ports in the seat 33 shown in Fig. 8. (See Fig. 3 also.) Emergency-port 39 on the side of slide-valve 29 is now in conjunction with the vertical port 41, that leads directly down from the slide-valve chamber to the emergency-piston 48. No other ports in the slide-valve and its seat are in register at this time save only these two. Through them a certain amount of pressure from the slide-valve chamber and the receiver passes downward and drives the piston 48 downward through its chamber 45, while the stem 50 of said piston 48, which carries the train-pipe emergency-valve 49, throws said valve from its seat, and the escape of train-pipe air past this valve is permitted through chamber 45 out into the atmosphere at outlet-port 100. Port 6, which, we have seen, is a large transverse port in the slide-valve seat 33, which port communicates with the brake-cylinder port 34, has been uncovered by the sliding away from it of the slide-valve that has previously covered it, so that through it the contents of the receiver 11 are discharged into the brake-cylinder. Thus it will be understood that the purpose of delaying the discharge of auxiliary-reservoir air into the brake-cylinder past the valve 19 for a short time immediately after the unseating of this valve 19 in emergency action, as set forth, is to allow time for the preliminary discharge of the contents of the receiver into the brake-cylinder through the ports 6 and 34, for, as is clearly apparent, when the main piston 15 makes its emergency movement and unseats the emergency-valve 19 it simultaneously causes the slide-valve to open the large receiver discharge-port 6. In this way the contents of the receiver flow into the brake-cylinder and exert a certain action upon the piston therein prior to the delivery of the heavy reservoir-pressure to said brake-cylinder. At the same time that the receiver contents pass to the brake-cylinder a sufficient amount of pressure will escape, as has been stated, through the ports 39 and 41 to operate the train-pipe exhaust-valve. When by reason of the loss of receiver-pressure to the brake-cylinder the force exerted against the left-hand side of piston 15 to impel it toward the right, and thereby control the position of the emergency-valve 19, decreases in strength, said piston 15 will begin to gradually move back toward the left end of its chamber 14. This return movement is brought about by the spring 21 acting to return the valve 19 toward its seat. When during this action the projection 62 is removed from the end of the chamber 61 and ceases to longer close said chamber, the reservoir-pressure will have an opportunity to pass from the port 25 into the chamber 20 and past valve 19 (said valve having not yet become seated again) into cylinder-port 26 and finally into the brake-cylinder. The size of port 6 must be varied or adjusted to leave enough pressure on the piston so that the valve 19 will not close until the reservoir has been discharged into the brake-cylinder. In emergency action, therefore, a certain degree of pressure is given to the brake-cylinder from the receiver and then a final and heavier degree of pressure from the reservoir, the latter being superadded to the former in order that the highest and most efficient braking power may be attained. Therefore in emergency action the receiving-chamber, which at certain times in the operation of the system forms a part of the auxiliary reservoir, but is cut off therefrom when the reservoir-pressure drops down to the degree known as the "reservoir constant," is employed to deliver its contents to the brake-cylinder in advance of the delivery thereto of the constant pressure retained intact in the auxiliary reservoir for the sole use of emergency.

I will next describe the action of the parts of the device in releasing after emergency action. For this purpose pressure will be restored in the train-pipe in the customary way. This will cause the parts to assume the position shown in Fig. 1, which is that of full release and is substantially the same as I have already referred to in discussing the initial charging of the system. When the piston 15 returns to its position in the left-hand end of chamber 14, its rod 27, or the collared end thereof, will strike the valve 73 and move it slightly, but not entirely, toward its seat, the movement not being sufficient to close the valve, although it will be sufficient to slide the connecting-stem 71 and open valve 72. Of course the relative sizes of the different parts will be so adjusted that when the piston 15 is in the left-hand end of chamber 14 the proper contact with the double valve will have taken place, and consequently at this time not only the valve 73, but also the valve 72, will be open, and hence there will be a passage from the brake-cylinder to the receiver, as well as to the atmosphere. The passage from the brake-cylinder to the receiver will be through port 68, valve 72, along the sides of the triangular valve-rod 71, through valve 73 to the nearest end of the slide-valve chamber, then into the receiver 11. The passage from the brake-cylinder to the atmosphere will be through port 68, valve 72, annular passage 75, port 34, the slide-valve recess 40, and the atmospheric outlet 35. Hence a large quantity of the fluid used in braking will be saved by being transferred back into the receiver 11 and not lost by efflux to the atmosphere.

Numerous changes in the precise construction, form, size, and combination of the various parts of my present valve mechanism, the port, and the passages may be made without departing from the invention, and I reserve the liberty of so diversifying and varying the construction and relations of the several constituent mechanical features as may best suit and adapt the valve for actual operation.

Having thus described my invention, what I claim as new, and desire to secure by Letters Patent, is—

1. In a fluid-pressure brake mechanism, the combination with the train-pipe, and brake-cylinder, of an auxiliary reservoir, and a receiver that forms at one time a part of the reservoir and at another time is disconnected therefrom so as to be a separate and independent chamber, said receiver supplying the pressure for service applications of the brakes while connected with the reservoir, and receiving a part of the exhaust at release after emergency, and also supplying an initial pressure in emergency applications, there being a certain constant pressure retained and reserved in the auxiliary reservoir unused at all times except in emergency action.

2. In a fluid-pressure brake mechanism, the combination with the train-pipe, brake-cylinder, and auxiliary reservoir, of a receiver that forms at one time a part of the reservoir and at another time is disconnected therefrom so as to be separate and independent, said receiver obtaining its supply by an intermittent feed from the train-pipe, from the excess in the auxiliary reservoir over and above a constantly-reserved emergency pressure therein, and from release after emergency action, said receiver being employed while connected with the reservoir in effecting service applications of the brakes, and also in effecting an initial braking power in emergency applications.

3. In a fluid-pressure brake mechanism, the combination with the train-pipe, brake-cylinder, and auxiliary reservoir, of a receiver that forms at one time a part of the reservoir and at another time is disconnected therefrom so as to be separate and independent, said receiver being supplied with a part of the exhaust-air at the time of release after emergency action, and also being supplied by the intermittent feeding from the train-pipe and from the reservoir excess, there being a certain constantly-reserved emergency pressure retained in the reservoir unused except in emergency action.

4. In a fluid-pressure brake mechanism, the combination with the train-pipe, and brake-cylinder, and auxiliary reservoir, of a receiver that forms at one time a part of the reservoir and at another time is disconnected therefrom so as to be separate and independent, said receiver being employed while open to the reservoir in service applications of the brakes, and also in effecting an initial braking power in emergency applications, and in venting the train-pipe air to the atmosphere at the time of emergency.

5. In a fluid-pressure brake mechanism, the combination with the train-pipe, brake-cylinder and auxiliary reservoir, of a receiver that forms at one time a part of the reservoir and at another time is disconnected therefrom so as to be separate and independent, said receiver having its supply afforded by an intermittent feed from the train-pipe and also from the reservoir excess, and from the brake-cylinder during release after emergency action, said receiver while it forms a part of the reservoir being employed in effecting service applications, and when separated from reservoir in effecting an initial braking pressure in emergency applications, and in venting train-pipe air to the atmosphere at the time of emergency.

6. In a fluid-pressure brake mechanism, the combination with the train-pipe, brake-cylinder, and auxiliary reservoir, of a receiver that forms at one time a part of the reservoir and at another time is disconnected therefrom, pressure-retaining means for keeping a certain constant pressure retained and reserved in the auxiliary reservoir unused at all times except in emergency action, which means permit communication between the reservoir and receiver when the air-pressure therein rises above the reservoir constant.

7. In a fluid-pressure brake mechanism, the combination with the train-pipe, brake-cylinder, and auxiliary reservoir, of a receiver that forms at one time a part of the reservoir and at another time is disconnected therefrom, and a pressure-retaining valve located in a passage-way between the auxiliary and the receiver, said valve having the function of keeping a certain constant pressure retained in the reservoir for use in emergency, but being arranged to open under the action of the excess when the reservoir-pressure rises above the constant pressure so as to permit said excess to flow to the receiver.

8. In a fluid-pressure brake mechanism, the combination with the train-pipe, brake-cylinder, and auxiliary reservoir containing a constantly-reserved volume of air for use only in emergency action, of a receiver that forms at one time a part of the reservoir and at another time is disconnected therefrom so as to be separate and independent, means for conducting air from the receiver and reservoir to the brake-cylinder in service applications of the brakes, and means for conducting air from the receiver to the brake-cylinder to afford a preliminary braking power in emergency action.

9. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, means for conducting air from the receiver and reservoir while connected, to the brake-cylinder in service applications of the brakes, and means for transferring a portion of the braking fluid to the receiver during release after an emergency application of the brakes.

10. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, means for conducting air from the receiver and reservoir while the two are connected to the brake-cylinder in service applications of the brakes, and means for transferring braking fluid to the receiver during release after emergency, said means consisting of a valve device that permits air to flow from the brake-cylinder to the receiver at the same time that it permits an exhaust to the atmosphere.

11. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, means for conducting air from the receiver and reservoir while connected to the brake-cylinder in service applications of the brakes, means for conducting air from the receiver to the brake-cylinder to afford a preliminary braking power in the emergency action, and for conducting the constantly-retained reservoir-pressure to the brake-cylinder in emergency, and means for transferring a portion of the braking fluid from the brake-cylinder to the receiver during release after emergency action.

12. In a fluid-pressure brake mechanism, the combination with the train-pipe, brake-cylinder, and auxiliary reservoir, of a receiver that forms at one time a part of the reservoir and at another time is disconnected therefrom, means for conducting air from the reservoir and receiver to the brake-cylinder in service applications means for preliminarily conducting air from the receiver to the brake-cylinder, and secondarily conducting air from the reservoir to the brake-cylinder in emergency action, and means for transferring a portion of the braking fluid from the brake-cylinder to the receiver during release after emergency.

13. In a fluid-pressure brake mechanism, the combination with the train-pipe, brake-cylinder, and auxiliary reservoir containing a constantly-reserved volume of air intact for use only in emergency action, of a receiver that forms at one time a part of the reservoir, at which time the pressure in reservoir and receiver is in excess of the constantly-retained pressure in the reservoir and said receiver being at another time disconnected from the reservoir so as to become a separate and independent chamber, means for conducting air from the receiver and reservoir, to the brake-cylinder in service applications of the brakes, means for conducting air from the receiver to the brake-cylinder to afford a preliminary braking power in emergency action, and for conducting the constantly-retained auxiliary-reservoir pressure to the brake-cylinder to be superadded to the previously-introduced receiver-pressure.

14. In a fluid-pressure brake mechanism, the combination with the train-pipe and brake-cylinder, of an auxiliary reservoir, and a receiver that forms at one time a part of the reservoir and at another time is disconnected therefrom so as to be a separate and independent chamber, said receiver supplying the pressure for service applications of the brakes and also supplying an initial pressure in emergency applications, there being a certain constant pressure retained and reserved in the auxiliary reservoir unused at all times except in emergency action.

15. In a fluid-pressure brake mechanism, the combination with the train-pipe, brake-cylinder, and auxiliary reservoir, of a receiver that forms at one time a part of the reservoir and at another time is disconnected therefrom, and means for keeping a certain constant pressure retained and reserved in the auxiliary reservoir unused at all times except in emergency action, said means permitting communication between the reservoir and receiver when the air-pressure in the former rises above the reservoir constant, and consisting essentially of a valve provided with a closing-spring having a certain retaining power and adapted to be automatically opened by the pressure of the air when it exceeds the power of the spring.

16. In a fluid-pressure brake mechanism, the combination with the train-pipe, brake-cylinder, and auxiliary reservoir, of a receiver that forms at one time a part of the reservoir and at another time is disconnected therefrom, and means for keeping a certain constant pressure retained and reserved in the auxiliary reservoir unused at all times except in emergency action, said means permitting communication between the reservoir and receiver when the air-pressure in the former rises above the reservoir constant, and consisting essentially of a valve carried by a diaphragm one side of which is exposed to the air-pressure in the reservoir.

17. In a fluid-pressure brake mechanism, the combination with the train-pipe, brake cylinder, and auxiliary reservoir, of a receiver that forms at one time a part of the reservoir and at another time is disconnected therefrom, and means for keeping a certain constant pressure retained and reserved in the auxiliary-reservoir unused at all times except in emergency action, said means permitting communication between the reservoir and receiver when the air-pressure in the former rises above the reservoir constant, and consisting of automatically-operating valve means arranged in connection with a passage between the reservoir and receiver, said means including a diaphragm attached to the valve proper which diaphragm is exposed on one side to the air-pressure in the reservoir and on its other side to the action of a closing-spring.

18. In a fluid-pressure brake mechanism, the combination with the train-pipe, brake-cylinder, and auxiliary reservoir, of a receiver that forms at one time a part of the reservoir and at another time is disconnected therefrom, and means for keeping a certain constant pressure retained and reserved in the auxiliary reservoir unused at all times except in emergency action, said means permitting communication between the reservoir and receiver when the air-pressure in the former rises above the reservoir constant, and consisting of a valve device located in connection with a passage between the reservoir and receiver, said device having a diaphragm exposed on one side to the pressure of air in the reservoir and engaged on its opposite side by a piston acted on by a spring and subjected to a certain amount of air-pressure.

19. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, and means for transferring a portion of the fluid from the brake-cylinder to the receiver during release after an emergency application of the brakes.

20. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, and means for transferring a portion of the fluid from the brake-cylinder to the receiver during release after an emergency application of the brakes, said means consisting of two valves moving in unison and allowing a flow to the receiver simultaneously with that to the atmosphere.

21. In a fluid-pressure brake mechanism, the combination with the train-pipe, brake-cylinder, and auxiliary reservoir, of a receiver that forms at one time a part of the reservoir and at another time is disconnected therefrom so as to be separate and independent, a valve device between the reservoir and receiver that retains a constant pressure in the reservoir and allows the excess to flow into the receiver, and means for transferring a portion of the fluid from the brake-cylinder to the receiver during release after an emergency application of the brakes, said means consisting of two valves on a common stem which are adapted to be simultaneously unseated to allow a flow to the receiver at the same time with the exhaust to the atmosphere.

22. In a fluid-pressure brake mechanism, the combination with the train-pipe, brake-cylinder, and auxiliary reservoir, of a receiver that forms at one time a part of the reservoir, and at another time is disconnected therefrom so as to be separate and independent, a valve device between the reservoir and receiver that retains a constant pressure in the reservoir and allows the excess to flow into the receiver, and means for transferring a portion of the fluid from the brake-cylinder to the receiver during release after an emergency application of the brakes, said means consisting of two valves on a common stem, the cross-section of which is triangular, or other shape, so that there may be an air-passage alongside the stem, these valves being adapted to be simultaneously unseated and one controlling the flow of air into the receiver from the passage alongside the valve-stem while the other controls the flow of air into said passage and at the same time the flow through the exhaust to the atmosphere.

23. In a fluid-pressure brake mechanism, the combination with the train-pipe, brake-cylinder and auxiliary reservoir, of a receiver that forms at one time a part of the reservoir and at another time is disconnected therefrom, a piston or abutment which actuates the valve devices by a reduction of train-pipe pressure on one side thereof in the performance of the service or emergency applications of the brakes, and a yielding graduation-stop which is not depressed in ordinary service applications, but which is depressed where equalization occurs after successive graduation applications, the depression allowing the piston to reach a fixed stop where it will uncover an escape-port in the piston-chamber to allow the exhaust of pressure through the train-pipe and thus prevent undesired emergency action.

24. In a fluid-pressure brake mechanism, the combination with the train-pipe, brake-cylinder, and auxiliary reservoir, of a receiver forming at one time a part of the reservoir and at another time being disconnected therefrom, means for conducting air from the reservoir and receiver to the brake-cylinder in the different applications of the brakes, a piston or abutment for operating said means when train-pipe pressure is reduced on one side thereof, and a yielding graduation-stop that allows said piston to uncover a port in the piston-chamber at the time of equalization after successive service actions to allow the escape of air through said port into the train-pipe, substantially as described.

25. In a fluid-pressure brake mechanism, the combination with the train-pipe, brake-cylinder, and auxiliary reservoir, of a receiver that forms at one time a part of the reservoir and at another time is disconnected therefrom, means for preliminarily conducting air from the receiver to the brake-cylinder and secondarily conducting air from the reservoir to the brake-cylinder during emergency application of the brakes, said means including a piston or abutment on one side of which train-pipe pressure is reduced, and a reservoir delivery-valve controlling a passage between the reservoir and the brake-cylinder, said valve having a certain movement before it opens to allow the passage of air, the delay being to permit an operation of a valve mechanism that controls the flow of air from the receiver to the brake-cylinder for an initial braking power previous to the passage of the full reservoir-pressure.

26. In a fluid-pressure brake mechanism, the combination with the train-pipe, brake-cylinder, and auxiliary reservoir, of a receiver that forms at one time a part of the reservoir and at another time is disconnected therefrom, means for preliminarily conducting air from the receiver to the brake-cylinder and secondarily conducting air from the reservoir to the brake-cylinder during emergency application of the brakes, said means including a piston or abutment on one side of which train-pipe pressure is reduced, and a reservoir delivery-valve controlling a passage between the reservoir and the brake-cylinder, said valve having a round projection that fills a chamber entered by the passage from the reservoir whereby its movement is delayed until after the initial transfer of air from the receiver to the brake-cylinder has been made so that such transfer can be in advance of the flow of the full braking pressure from the reservoir.

27. In a fluid-pressure brake mechanism, the combination with the train-pipe, brake-cylinder, and auxiliary reservoir, of a receiver that forms at one time a part of the reservoir and at another time is disconnected therefrom, valve devices for preliminarily conducting air from receiver to the brake-cylinder in emergency applications and valve devices for secondarily conducting air from the reservoir to the brake-cylinder in emergency action, and a piston or abutment on one side of which train-pipe pressure is reduced in applying the brakes, the movement of said piston actuating both valve devices aforesaid, the valve device between the auxiliary reservoir and the cylinder having an initial ineffective movement while the receiver-air is being discharged into the cylinder after which in consequence of the return movement of the piston owing to the equalization of pressure the reservoir delivery device will actively open to permit the flow of air to the cylinder.

Signed at Carthage, New York, this 25th day of February, 1901.

EDWARD G. SHORTT.

Witnesses:
 M. C. PAUL,
 A. F. MILLS.